US012610131B2

(12) United States Patent (10) Patent No.: US 12,610,131 B2
Yano et al. (45) Date of Patent: Apr. 21, 2026

(54) INFORMATION PROCESSING APPARATUS, METHOD THEREOF, AND PROGRAM THEREOF, AND INFORMATION PROCESSING SYSTEM

(71) Applicant: FUJIFILM Corporation, Tokyo (JP)

(72) Inventors: Hironori Yano, Saitama (JP); Mototada Otsuru, Saitama (JP); Isao Koizumi, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 160 days.

(21) Appl. No.: 18/359,938

(22) Filed: Jul. 27, 2023

(65) Prior Publication Data

US 2024/0040232 A1     Feb. 1, 2024

(30) Foreign Application Priority Data

Jul. 29, 2022     (JP) ................................. 2022-121543

(51) Int. Cl.
*H04N 23/62* (2023.01)
*H04N 23/617* (2023.01)

(52) U.S. Cl.
CPC ........... *H04N 23/62* (2023.01); *H04N 23/617* (2023.01)

(58) Field of Classification Search
CPC .............................. H04N 23/62; H04N 23/617
See application file for complete search history.

(56) References Cited

U.S. PATENT DOCUMENTS 7,127,164 B1 * 10/2006 Parulski ............. H04N 21/4756
386/E9.036
2007/0172224 A1     7/2007 Yukitake et al.
(Continued)

FOREIGN PATENT DOCUMENTS

JP     2003-008967 A     1/2003
JP     2004-078207 A     3/2004
(Continued)

OTHER PUBLICATIONS

An Office Action, "Notice of Reasons for Refusal," mailed by the Japanese Patent Office on Feb. 4, 2026, which corresponds to Japanese Patent Application No. 2022-121543 and is related to U.S. Appl. No. 18/359,938; with English language translation.

*Primary Examiner* — Christopher K Peterson
(74) *Attorney, Agent, or Firm* — Studebaker Brackett PLLC

(57)     ABSTRACT

An information processing apparatus, a method thereof, and a program thereof, and an information processing system that can perform imaging complying with content of an instruction are provided.

An information processing apparatus acquires input of first information related to information about equipment used for imaging from a first terminal apparatus of an imaging person, acquires input of second information related to information about content of an instruction with respect to imaging from a second terminal apparatus of a requesting person, derives a setting of the equipment required for performing imaging complying with the instruction and an operation method of the equipment required for the setting based on the first information and on the second information, and outputs third information related to information about the operation method to the first terminal apparatus of the imaging person.

13 Claims, 15 Drawing Sheets

(56)        References Cited

U.S. PATENT DOCUMENTS

| | | | | |
|---|---|---|---|---|
| 2016/0212327 A1* | 7/2016 | Dietel | .................... | H04N 23/63 |
| 2020/0012855 A1 | 1/2020 | Miura et al. | | |
| 2020/0236275 A1* | 7/2020 | Terada | .................. | H04N 23/80 |

FOREIGN PATENT DOCUMENTS

| | | | |
|---|---|---|---|
| JP | 2006-014119 | A | 1/2006 |
| JP | 2006-048605 | A | 2/2006 |
| JP | 2007-201693 | A | 8/2007 |
| JP | 2008-258744 | A | 10/2008 |
| JP | 2014-010825 | A | 1/2014 |
| JP | 2018-078359 | A | 5/2018 |
| JP | 2021-064886 | A | 4/2021 |
| WO | 2018/159224 | A1 | 9/2018 |
| WO | 2022/014143 | A1 | 1/2022 |

* cited by examiner

Figure 2:
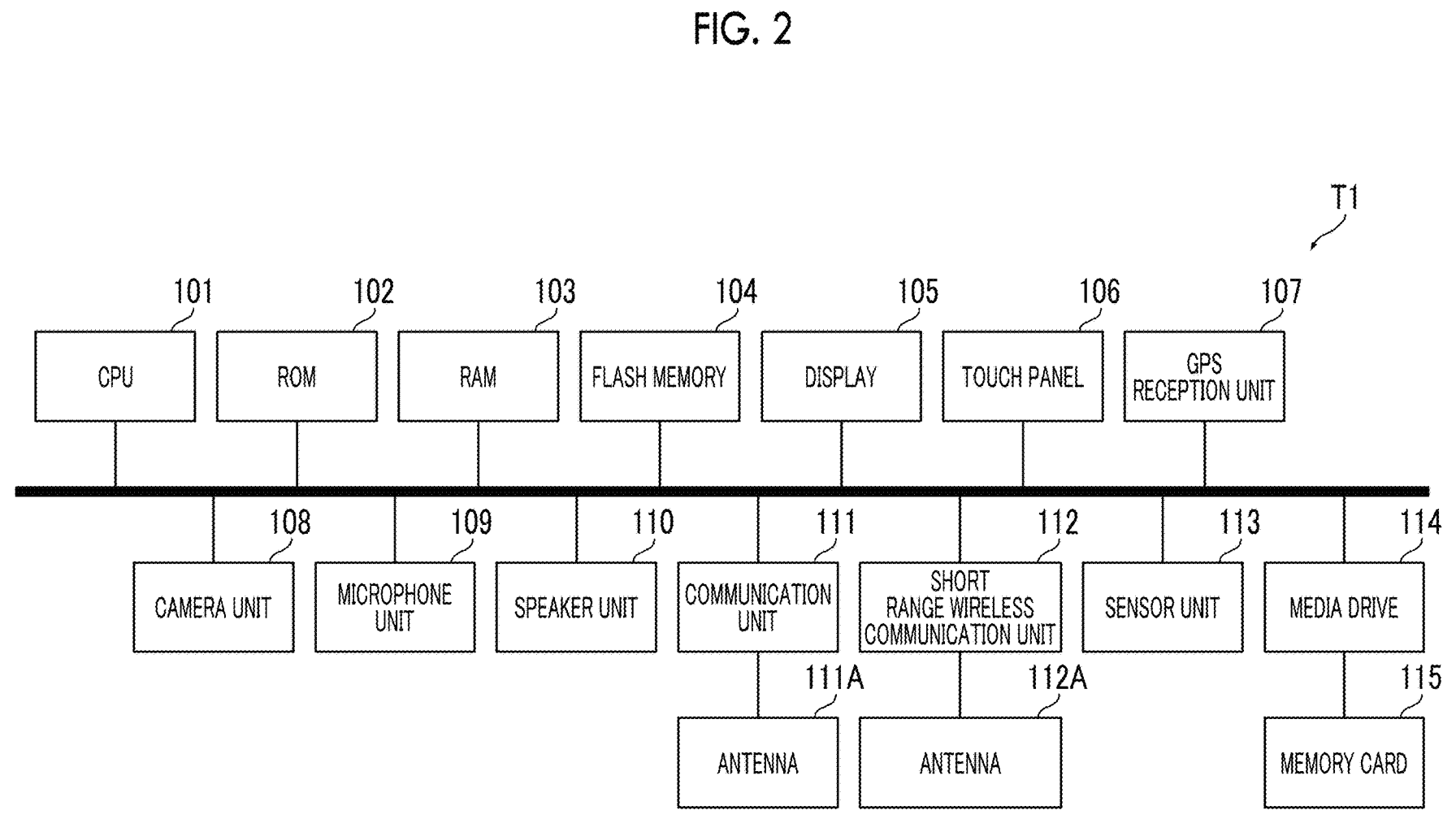

| 101 CPU | 102 ROM | 103 RAM | 104 FLASH MEMORY | 105 DISPLAY | 106 TOUCH PANEL | 107 GPS RECEPTION UNIT |

| 108 CAMERA UNIT | 109 MICROPHONE UNIT | 110 SPEAKER UNIT | 111 COMMUNICATION UNIT | 111A ANTENNA | 112 SHORT RANGE WIRELESS COMMUNICATION UNIT | 112A ANTENNA | 113 SENSOR UNIT | 114 MEDIA DRIVE | 115 MEMORY CARD |

| TERM (TOPIC) | SETTING OF EQUIPMENT (SETTING INFORMATION) |
|---|---|
| TO HAVE SOFT LOOK | F NUMBER: LOW, EXPOSURE CORRECTION: POSITIVE |
| TO HAVE DYNAMIC LOOK | F NUMBER: HIGH, LENS: WIDE ANGLE |
| . . . | . . . |

| MANUFACTURER | APPARATUS TYPE | MANUAL DATA | |
| --- | --- | --- | --- |
| | | INDEX DATA | BODY DATA |
| ABC | X-001 | 🗎 | 🗎 |
| | X-002 | 🗎 | 🗎 |
| | ⋮ | ⋮ | ⋮ |
| DEF | Y-001 | 🗎 | 🗎 |
| | Y-002 | 🗎 | 🗎 |
| | ⋮ | ⋮ | ⋮ |
| ⋮ | ⋮ | ⋮ | ⋮ |

INFORMATION PROCESSING APPARATUS, METHOD THEREOF, AND PROGRAM THEREOF, AND INFORMATION PROCESSING SYSTEM

CROSS-REFERENCE TO RELATED APPLICATION

The present application claims priority under 35 U.S.C § 119(a) to Japanese Patent Application No. 2022-121543 filed on Jul. 29, 2022, which is hereby expressly incorporated by reference, in its entirety, into the present application.

BACKGROUND OF THE INVENTION

1. Field of the Invention

The present invention relates to an information processing apparatus, a method thereof, and a program thereof, and an information processing system, and particularly to an information processing apparatus, a method thereof, and a program thereof, and an information processing system for processing information related to operation of equipment used for imaging.

2. Description of the Related Art

JP2014-10825A discloses a technology for finding a person to cooperate in imaging using social media with respect to a request for imaging.

JP2006-14119A discloses a system that transmits an image captured by a video camera to a client through a network.

JP2008-258744A discloses a technology for converting an imaging operation performed using one camera out of two cameras having different operation methods into the operation method of the other camera and displaying the converted imaging operation on a display unit of the other camera.

JP2007-201693A discloses a technology for performing a desired imaging control setting by performing a layered guidance display.

SUMMARY OF THE INVENTION

One embodiment according to the disclosed technology provides an information processing apparatus, a method thereof, and a program thereof, and an information processing system that can perform imaging complying with content of an instruction.

(1) An information processing apparatus comprising a processor, in which the processor is configured to acquire input of first information related to information about equipment used for imaging, acquire input of second information related to information about content of an instruction with respect to imaging, derive a setting of the equipment required for performing imaging complying with the instruction and an operation method of the equipment required for the setting based on the first information and on the second information, and output third information related to information about the operation method.

(2) The information processing apparatus according to (1), in which the processor is configured to output the second information.

(3) The information processing apparatus according to (1) or (2), in which the second information is composed of text information, and the processor is configured to extract a topic related to imaging from the text information, and derive the setting corresponding to the topic.

(4) The information processing apparatus according to (3), in which the processor is configured to derive the setting corresponding to the topic by referring to a first database in which information related to the setting is recorded.

(5) The information processing apparatus according to (4), in which the processor is configured to derive the setting corresponding to the topic by referring to the first database in which the topic and the information related to the setting are recorded in association with each other.

(6) The information processing apparatus according to any one of (1) to (5), in which the processor is configured to acquire information related to a manual corresponding to the equipment from a second database in which information related to a manual of the equipment is recorded, and derive the operation method based on the information related to the manual.

(7) The information processing apparatus according to (6), in which the first information includes the information related to the manual of the equipment, and the processor is configured to acquire the input of the first information and record the information related to the manual of the equipment included in the first information in the second database.

(8) The information processing apparatus according to (6) or (7), in which the processor is configured to extract, from the manual of the equipment, a location in which the operation method of the equipment required for the setting is described.

(9) The information processing apparatus according to any one of (1) to (8), in which the processor is configured to acquire the input of the first information from a first terminal, acquire the input of the second information from a second terminal, and output the third information and the second information to the first terminal.

(10) The information processing apparatus according to (9), in which the processor is configured to receive images captured by the equipment in time series and transmit the images to the second terminal.

(11) The information processing apparatus according to any one of (1) to (10), in which the processor is configured to receive information related to a setting of the equipment in capturing an image, and derive the setting of the equipment required for performing imaging complying with the instruction and the operation method of the equipment required for the setting based on the first information, the second information, and the information related to the setting of the equipment in capturing the image.

(12) An information processing system comprising a first terminal owned by a first user contracted to perform imaging, a second terminal owned by a second user who requests imaging, and the information processing apparatus according to any one of (1) to (11), in which the information processing apparatus acquires the input of the first information from the first terminal, acquires the input of the second information from the second terminal, and outputs the third information to the first terminal.

(13) An information processing method comprising acquiring input of first information related to information about equipment used for imaging, acquiring input of second information related to information about content of an instruction with respect to imaging, deriving a setting of the equipment required for performing imaging complying with the instruction and an operation method of the equipment required for the setting based on the first information and on the second information, and outputting third information related to information about the operation method.

(14) An information processing program causing a computer to implement a function of acquiring input of first information related to information about equipment used for imaging, a function of acquiring input of second information related to information about content of an instruction with respect to imaging, a function of deriving a setting of the equipment required for performing imaging complying with the instruction and an operation method of the equipment required for the setting based on the first information and on the second information, and a function of outputting third information related to information about the operation method.

BRIEF DESCRIPTION OF THE DRAWINGS

FIG. 2 is a block diagram illustrating an example of a hardware configuration of a first terminal apparatus.

FIG. 3 is a block diagram showing an example of a hardware configuration of a second terminal apparatus.

FIG. 7 is a diagram illustrating an example of an equipment setting database.

FIG. 8 is a diagram illustrating an example of a manual database.

DESCRIPTION OF THE PREFERRED EMBODIMENTS

Hereinafter, preferred embodiments of the present invention will be described in detail in accordance with the accompanying drawings.

First Embodiment

A matching service as a service for arranging a match and connecting between a person having demand and a person capable of providing supply has been known. In the field of photography, a matching service for arranging a match and connecting between a person who wants to request imaging and a person capable of performing imaging has been known. By using the matching service, for example, it is possible to request imaging by simply finding a person who can deal with the request even in a case where imaging is performed at a remote location.

However, the matching service in photography poses a problem in that it is difficult to designate equipment. Thus, problems arise in that it is difficult to understand to which operation an imaging instruction of a requesting person corresponds in equipment of an imaging person, and that it is difficult to provide a detailed imaging instruction.

In the present embodiment, an information processing system capable of performing imaging that reflects intention of the requesting person in a case of requesting another person to perform imaging using the matching service or the like will be described.

Information Processing System

The information processing system of the present embodiment is configured as a system that receives an instruction with respect to imaging from the requesting person, derives an operation method of equipment required for performing imaging complying with the instruction, and presents the operation method to the imaging person.

System Configuration

Figure 1:
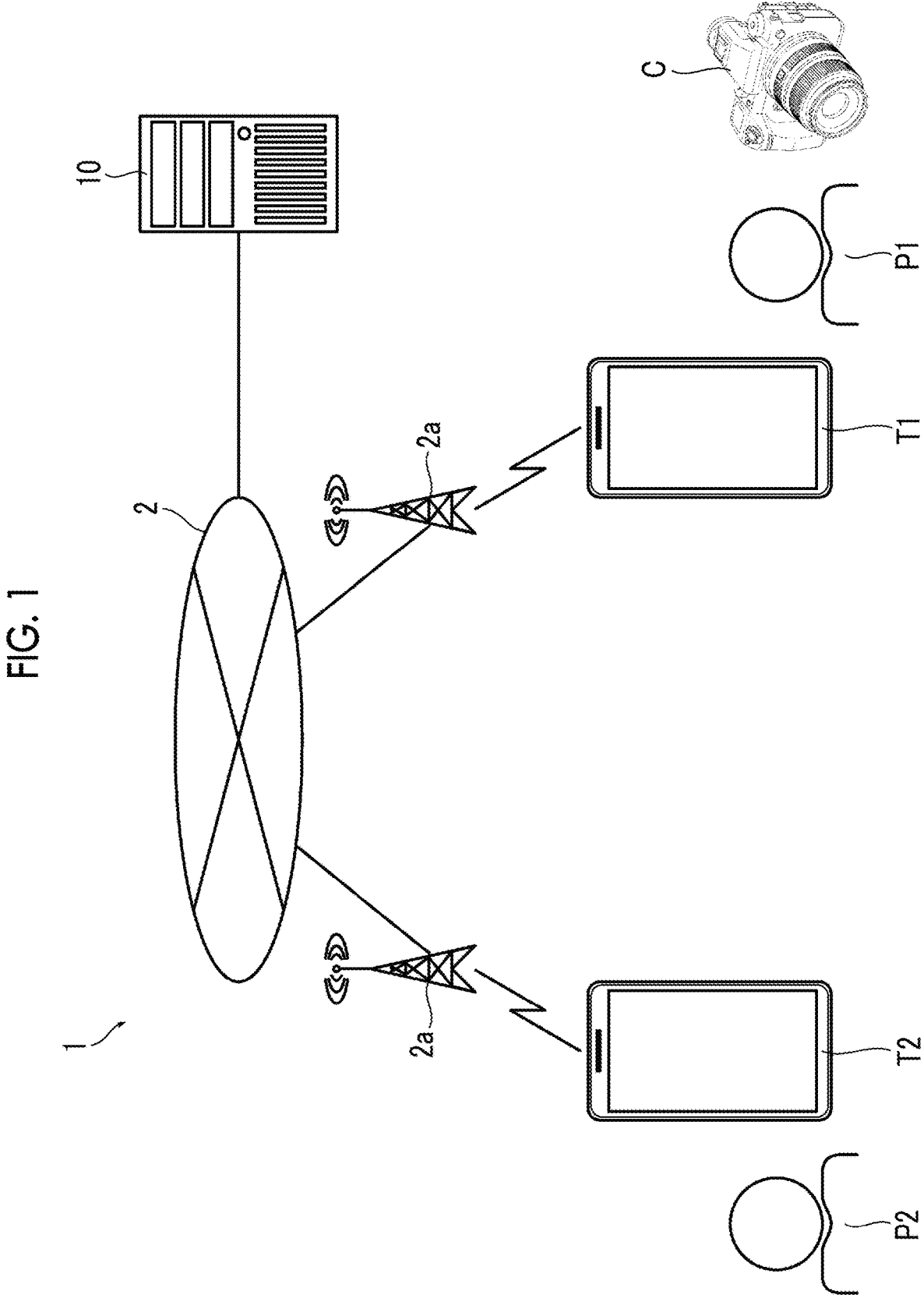
FIG. 1 is a diagram illustrating an example of a configuration of an information processing system.

FIG. 1 is a diagram illustrating an example of a configuration of the information processing system.

As illustrated in FIG. 1, an information processing system 1 has a configuration comprising a first terminal apparatus T1 owned by an imaging person P1, a second terminal apparatus T2 owned by a requesting person P2, and an information processing apparatus 10 that processes information acquired from the first terminal apparatus T1 and from the second terminal apparatus T2. The information processing apparatus 10 is communicably connected to the first terminal apparatus T1 and to the second terminal apparatus T2 through a communication network 2. The communication network 2 is constructed of, for example, a wireless communication network such as 5th generation (5G), 4th generation (4G), 3rd generation (3G), Worldwide Interoperability for Microwave Access (WiMAX), or long term evolution (LTE), each base station 2a, and the Internet.

In the information processing system 1 of the present embodiment, the imaging person P1 corresponds to a first user contracted to perform imaging, and the requesting person P2 corresponds to a second user who requests imaging. The first terminal apparatus T1 is an example of a first terminal, and the second terminal apparatus T2 is an example of a second terminal.

First Terminal Apparatus and Second Terminal Apparatus

The first terminal apparatus T1 and the second terminal apparatus T2 are composed of computers having a communication function. Specifically, the first terminal apparatus T1 and the second terminal apparatus T2 are composed of mobile computers such as a smartphone, a tablet terminal, a laptop personal computer, or personal data assistance (PDA) having a communication function.

FIG. 2 is a block diagram illustrating an example of a hardware configuration of the first terminal apparatus. FIG. 2 illustrates an example of a case where the first terminal apparatus T1 is composed of a smartphone.

As illustrated in FIG. 2, the first terminal apparatus T1 comprises a CPU 101, a ROM 102, a RAM 103, a flash memory 104 that stores various programs including an operating system (OS) and various types of data, a display 105, a touch panel 106 that detects a touch operation on a display screen, a GPS reception unit 107 that receives a global positioning systems (GPS) signal, a camera unit 108 that electronically captures an image, a microphone unit 109 that inputs voice, a speaker unit 110 that outputs voice, a communication unit 111 that wirelessly communicates with the nearest base station 2a or the like through an antenna 111A, a short range wireless communication unit 112 that wirelessly communicates with an external apparatus in a short range through an antenna 112A, a sensor unit 113 including various sensors such as a geomagnetic sensor, a gyro compass, and an acceleration sensor, a media drive 114 that reads and writes data on a memory card 115, and the like.

The first terminal apparatus T1 receives input of predetermined information from the imaging person P1 and transmits the input information to the information processing apparatus 10. In addition, information transmitted from the information processing apparatus 10 is received and output to the display 105. In addition, voice is output from the speaker unit 110 as necessary. The first terminal apparatus T1 implements these functions by executing a predetermined program via the CPU 101 that is a processor.

Figure 3:
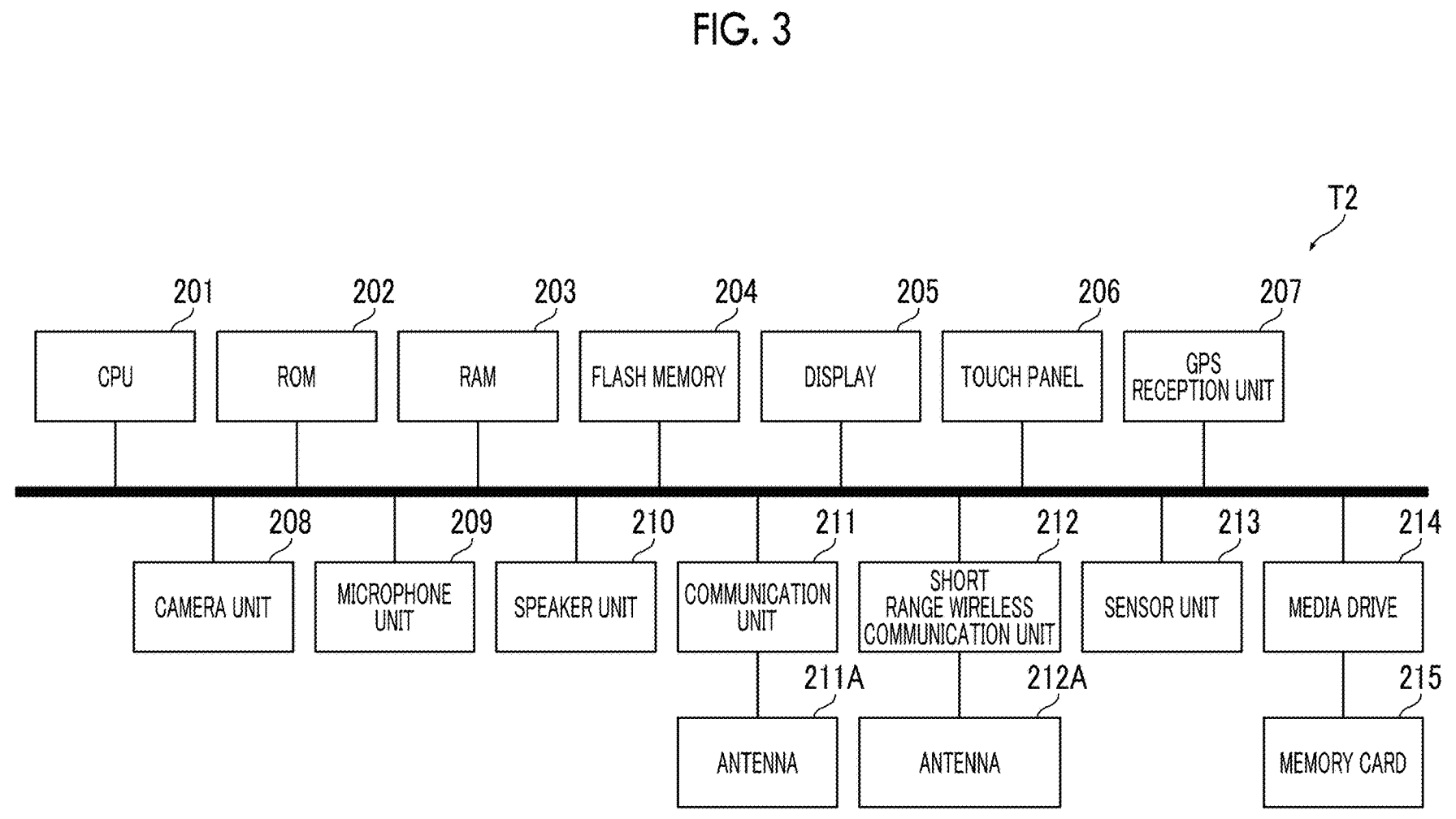

FIG. 3 is a block diagram showing an example of a hardware configuration of the second terminal apparatus. FIG. 3 illustrates an example of a case where the second terminal apparatus T2 is composed of a smartphone.

As illustrated in FIG. 3, the second terminal apparatus T2 comprises, in the same manner as the first terminal apparatus T1, a CPU 201, a ROM 202, a RAM 203, a flash memory 204, a display 205, a touch panel 206, a GPS reception unit 207, a camera unit 208, a microphone unit 209, a speaker unit 210, a communication unit 211 that wirelessly communicates with the nearest base station 2a or the like through an antenna 211A, a short range wireless communication unit 212 that wirelessly communicates with an external apparatus in a short range through an antenna 212A, a sensor unit 213, a media drive 214 that reads and writes data on a memory card 215, and the like.

The second terminal apparatus T2 receives input of predetermined information from the requesting person P2 of imaging and transmits the input information to the information processing apparatus 10. In addition, information transmitted from the information processing apparatus 10 is received and output to the display 205. In addition, voice is output from the speaker unit 210 as necessary. The second terminal apparatus T2 implements these functions by executing a predetermined program via the CPU 201 that is a processor.

Information Processing Apparatus

The information processing apparatus 10 is composed of a computer having a communication function.

Figure 4:
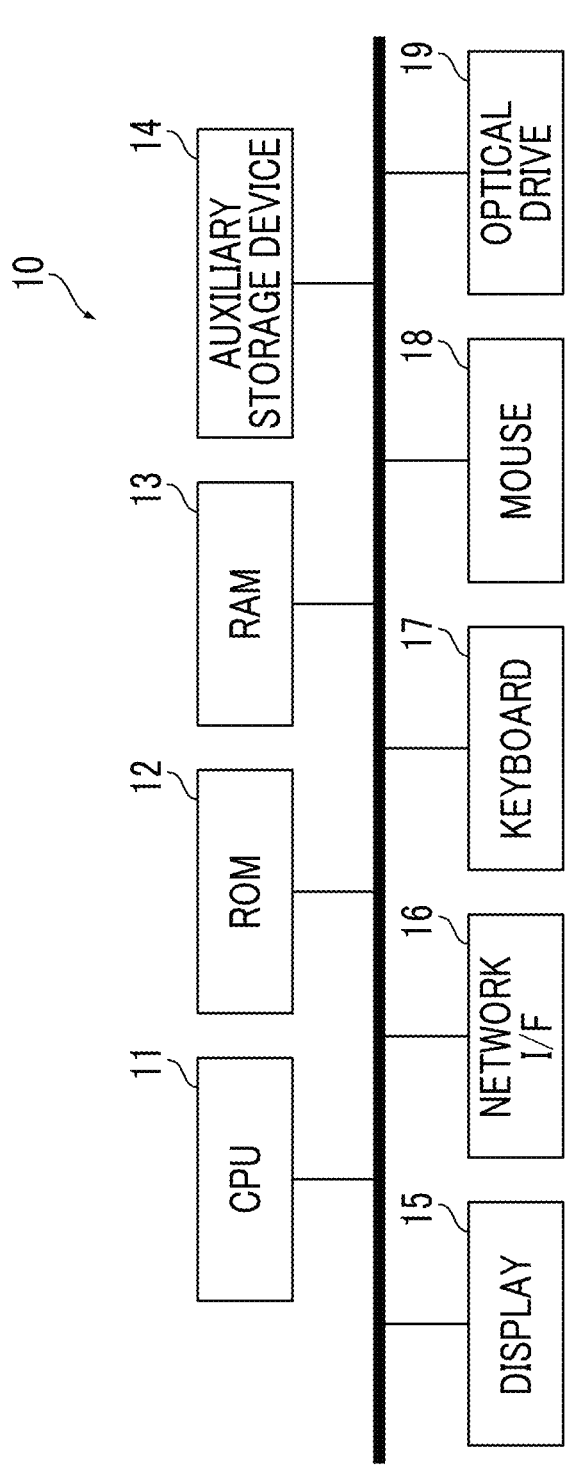
FIG. 4 is a block diagram illustrating an example of a hardware configuration of a data storage server.

FIG. 4 is a block diagram illustrating an example of a hardware configuration of a data storage server.

As illustrated in FIG. 4, the information processing apparatus 10 comprises a CPU 11, a ROM 12, a RAM 13, an auxiliary storage device 14 that stores various programs including an OS and various types of data, a display 15, a network interface (I/F) 16 for data communication using the communication network 2, a keyboard 17, a mouse 18, an optical drive 19, and the like. For example, the auxiliary storage device 14 is composed of a flash memory including a solid state drive (SSD) or of a hard disk drive (HDD). The CPU 11 is an example of a processor.

Figure 5:
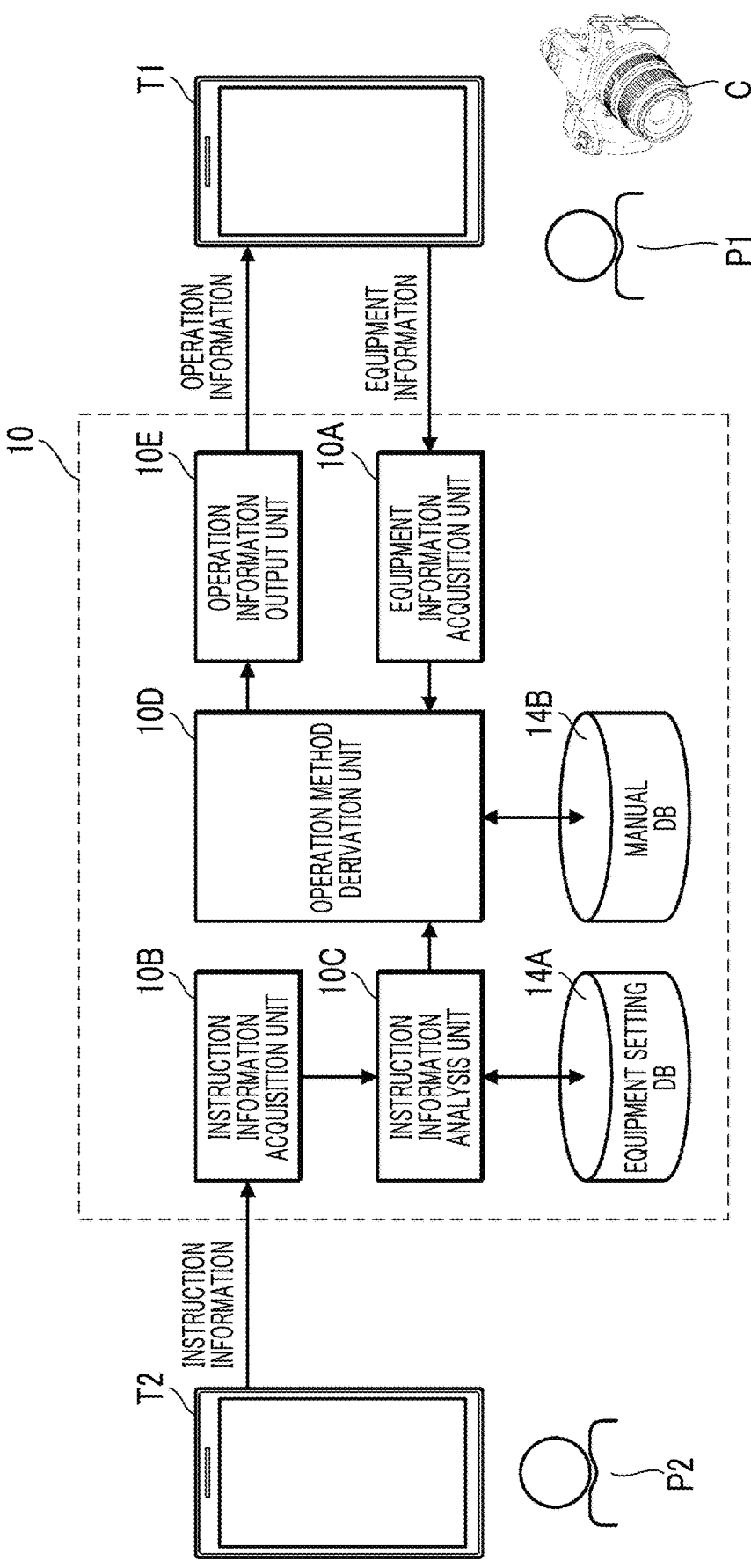
FIG. 5 is a block diagram of main functions provided by an information processing apparatus.

FIG. 5 is a block diagram of main functions provided by the information processing apparatus.

As illustrated in FIG. 5, the information processing apparatus 10 has functions of an equipment information acquisition unit 10A, an instruction information acquisition unit 10B, an instruction information analysis unit 10C, an operation method derivation unit 10D, an operation information output unit 10E, and the like. Functions of each unit are implemented by executing a predetermined program (information processing program) via the CPU 11.

The equipment information acquisition unit 10A acquires input of information about equipment C (equipment information) used for imaging. The input of the equipment information is acquired from the first terminal apparatus T1. The imaging person P1 contracted to perform imaging inputs the equipment information into the first terminal apparatus T1 owned by the imaging person Pb. In a case where the equipment information is input, the first terminal apparatus T1 transmits the input equipment information to the information processing apparatus 10. The equipment information acquisition unit 10A receives and acquires the equipment information transmitted from the first terminal apparatus T1.

Here, the equipment information is composed of information with which the equipment C used for imaging can be specified. The equipment C used for imaging is a so-called camera. Cameras include an apparatus having a camera function. Accordingly, the equipment C used for imaging includes a smartphone with a camera, a tablet terminal with a camera, and the like. The equipment information is composed of, for example, a combination of a manufacturer name and an apparatus type name. The manufacturer name is a company name of a manufacturer. The apparatus type name has the same meaning as a product name, a model name, a serial number, a model number, and the like. For example, in a case of using a camera of an apparatus type "X-001" of "ABC Company", the equipment information is "ABC, X-001". Here, "ABC" is the manufacturer name, and "X-001" is the apparatus type name.

For the input of the equipment information, for example, a configuration of directly inputting texts of the manufacturer name and the apparatus type name may be used, or a configuration of selecting and inputting the equipment information from candidates may be used. In the configuration of selecting and inputting the equipment information from candidates, first, a list of selectable manufacturer names is displayed on the display 105, and the imaging person P1 selects one from the displayed list of manufacturer names. Then, for example, a list of apparatus type names of apparatus types being sold from the selected manufacturer is displayed on the display 105, and the imaging person P1 selects one from the displayed list of apparatus type names. For the text input, a general text input function provided in the first terminal apparatus T1 is used.

In the present embodiment, the "equipment information" is an example of first information related to the information about the equipment C used for imaging.

The instruction information acquisition unit 10B acquires input of information about content of the instruction (instruction information) with respect to imaging. The input of the instruction information is acquired from the second terminal apparatus T2. The requesting person P2 of imaging inputs the instruction information into the second terminal apparatus T2 owned by the requesting person P2. In a case where the instruction information is input, the second terminal apparatus T2 transmits the input instruction information to the information processing apparatus 10. The instruction information acquisition unit 10B receives and acquires the instruction information transmitted from the second terminal apparatus T2.

For the input of the instruction information, for example, a configuration of inputting a text of instruction content may be used, or a configuration of inputting voice using a well-known voice recognition technology may be used. For the text input, a general text input function provided in the second terminal apparatus T2 is used.

In the present embodiment, the instruction content is expressed in a natural language as an example. Accordingly, the instruction information is composed of a sentence expressed in a natural language and is composed of information about a text (text information) in which the sentence is expressed with a text. Accordingly, for example, an imaging instruction is input in an expression format such as "please perform imaging to have a soft look" or "please perform imaging to have a dynamic look".

In the present embodiment, the "instruction information" is an example of second information related to the information about the content of the instruction with respect to imaging.

The instruction information analysis unit 10C analyzes the instruction information acquired by the instruction information acquisition unit 10B and derives a setting of the equipment required for performing imaging complying with the instruction.

Figure 6:
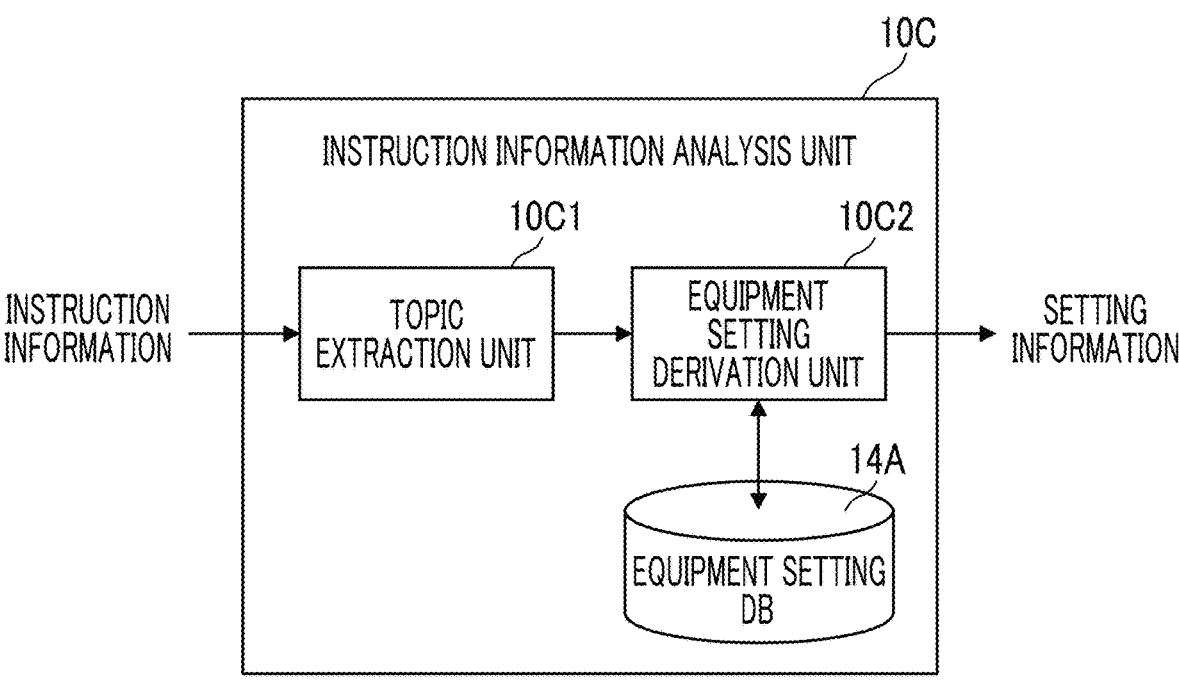
FIG. 6 is a block diagram of main functions of an instruction information analysis unit.

FIG. 6 is a block diagram of main functions of the instruction information analysis unit.

As illustrated in FIG. 6, the instruction information analysis unit 10C has functions of a topic extraction unit 10C1, an equipment setting derivation unit 10C2, and the like.

The topic extraction unit 10C1 analyzes the instruction information and extracts a topic from the sentence showing the content of the instruction. A topic related to imaging is extracted as the topic. For example, the topic extraction unit 10C1 is composed of a topic model generated using machine learning (for example, composed of a well-known topic model such as latent dirichlet allocation (LDA)). In addition, for example, the topic extraction unit 10C1 performs processing (morphological analysis) of dividing the sentence into words as necessary.

By the topic extraction unit 10C1, for example, a topic "to have a soft look" is extracted from the imaging instruction "please perform imaging to have a soft look". In addition, a topic "to have a dynamic look" is extracted from the imaging instruction "please perform imaging to have a dynamic look".

The equipment setting derivation unit 10C2 derives a setting of the equipment (camera) corresponding to the topic extracted by the topic extraction unit 10C1. Here, the topic extracted by the topic extraction unit 10C1 is a topic extracted from the instruction information. Accordingly, the setting of the equipment complying with the instruction is derived by deriving the setting of the equipment corresponding to the topic. That is, the setting of the equipment required for performing imaging complying with the instruction is derived. Here, the setting of the equipment is a universal setting that applies to any imaging equipment (camera). For example, the setting is about a shutter speed (imaging time), an F number (F-number), International Organization for Standardization (ISO) sensitivity (ISO film speed), an exposure correction amount, white balance, and a lens.

In the present embodiment, the equipment setting derivation unit 10C2 derives the setting of the equipment corresponding to the topic by referring to an equipment setting database (DB) 14A.

FIG. 7 is a diagram illustrating an example of the equipment setting database.

In the equipment setting database 14A, a plurality of terms related to imaging are recorded, and information related to the setting of the equipment (setting information) is recorded in association with each recorded term. The recorded terms are terms that may be extracted as the topic. In other words, the terms recorded in the equipment setting database 14A are extracted by the topic extraction unit 10C1. The terms recorded in the equipment setting database 14A are composed of the vocabulary in the field of imaging. The setting information of the equipment is composed of information related to the setting of the equipment required for imaging with respect to the associated terms. For example, as illustrated in FIG. 7, information "F number: low, exposure correction: positive" is recorded as the setting information of the equipment with respect to the term "to have a soft look". In a case of imaging to have a soft look, generally, blurriness is used, and imaging is performed with brightness. Thus, the setting information of content indicating setting the F number to be low and correcting exposure to a positive side is recorded with respect to the term "to have a soft look". In addition, information "F number: high, lens: wide angle" is recorded as the setting information of the equipment with respect to the term "to have a dynamic look". In a case of imaging a landscape or the like to have a dynamic look, generally, a lens having a wide angle of view is used. In addition, imaging is performed to have a sharp look by highlighting contrast. Thus, the setting information of content indicating using a wide angle lens or zooming to a wide side and setting the F number to be high is recorded with respect to the term "to have a dynamic look".

The equipment setting derivation unit 10C2 acquires the setting information of the equipment corresponding to the topic by referring to the equipment setting database 14A with respect to the topic extracted by the topic extraction unit 10C1.

The equipment setting database 14A is stored in the auxiliary storage device 14. In the present embodiment, the equipment setting database 14A is an example of a first database in which the information related to the setting is recorded.

The operation method derivation unit 10D derives an operation method of the equipment C required for performing the setting derived by the instruction information analysis unit 10C. In the present embodiment, the operation method derivation unit 10D derives the operation method of the equipment C by referring to a manual database 14B.

FIG. 8 is a diagram illustrating an example of the manual database.

Data of a manual of each equipment (manual data) is recorded in the manual database 14B. For example, the manual data is recorded in association with the manufacturer name and with the apparatus type name. Thus, corresponding manual data can be specified from information about the manufacturer name and the apparatus type name acquired as the equipment information. The operation method derivation unit 10D acquires the manual data of the equipment C used by the imaging person P1 from the manual database 14B based on the equipment information acquired by the equipment information acquisition unit 10A.

The manual data is configured to include body data in which the operation method is described, and index data. The body data is recorded in a predetermined electronic document file format. As an example, the body data is recorded in portable document format (PDF). The index data is data for an index and is data in which main phrases, items, and the like described in the body data are lined up in a specific arrangement and in which locations thereof (pages on which descriptions thereof are present) are recorded. Usually, indexes are appended to manuals. Accordingly, an index appended to the manual may be used as the index data. That is, data of the index may be extracted from the manual and be used as the index data. In addition, the index data may be individually generated to be suitably used in the present system. In this case, index data corresponding to the setting of the equipment derived by the instruction information analysis unit 10C is generated.

The manual database 14B is stored in the auxiliary storage device 14. In the present embodiment, the manual database 14B is an example of a second database in which information related to the manual of the equipment C is recorded.

The operation method derivation unit 10D specifies a page of the manual on which a target operation method is described (a location in which the operation method of the equipment required for the setting is described) by referring to the index data. That is, in the present embodiment, the operation method of the equipment C is derived by finding the operation method of the equipment C required for performing the derived setting from the manual of the equipment C. The operation method derivation unit 10D extracts data of the specified page from the body data and outputs the extracted data as information about the operation method (operation information). For example, in a case where a setting "F number: low, exposure correction: positive") is derived, the operation method derivation unit 10D outputs the operation information as follows. First, a page on which an operation method of "F number" is described and a page on which an operation method of the exposure correction is described are specified from the index data of the manual of the equipment C used by the imaging person P1. Next, data of the specified pages is extracted from the body data of the manual. The extracted data of the pages is output as the operation information. In the present embodiment, the operation information is an example of third information related to the information about the operation method.

The operation information output unit 10E outputs (transmits) the operation information to the first terminal apparatus T1 of the imaging person P1. In the present embodiment, the instruction information and the setting information are output together with the operation information.

The first terminal apparatus T1 acquires (receives) the operation information, the instruction information, and the setting information output (transmitted) from the operation information output unit 10E and outputs (displays) the operation information, the instruction information, and the setting information to the display 105.

Figure 9:
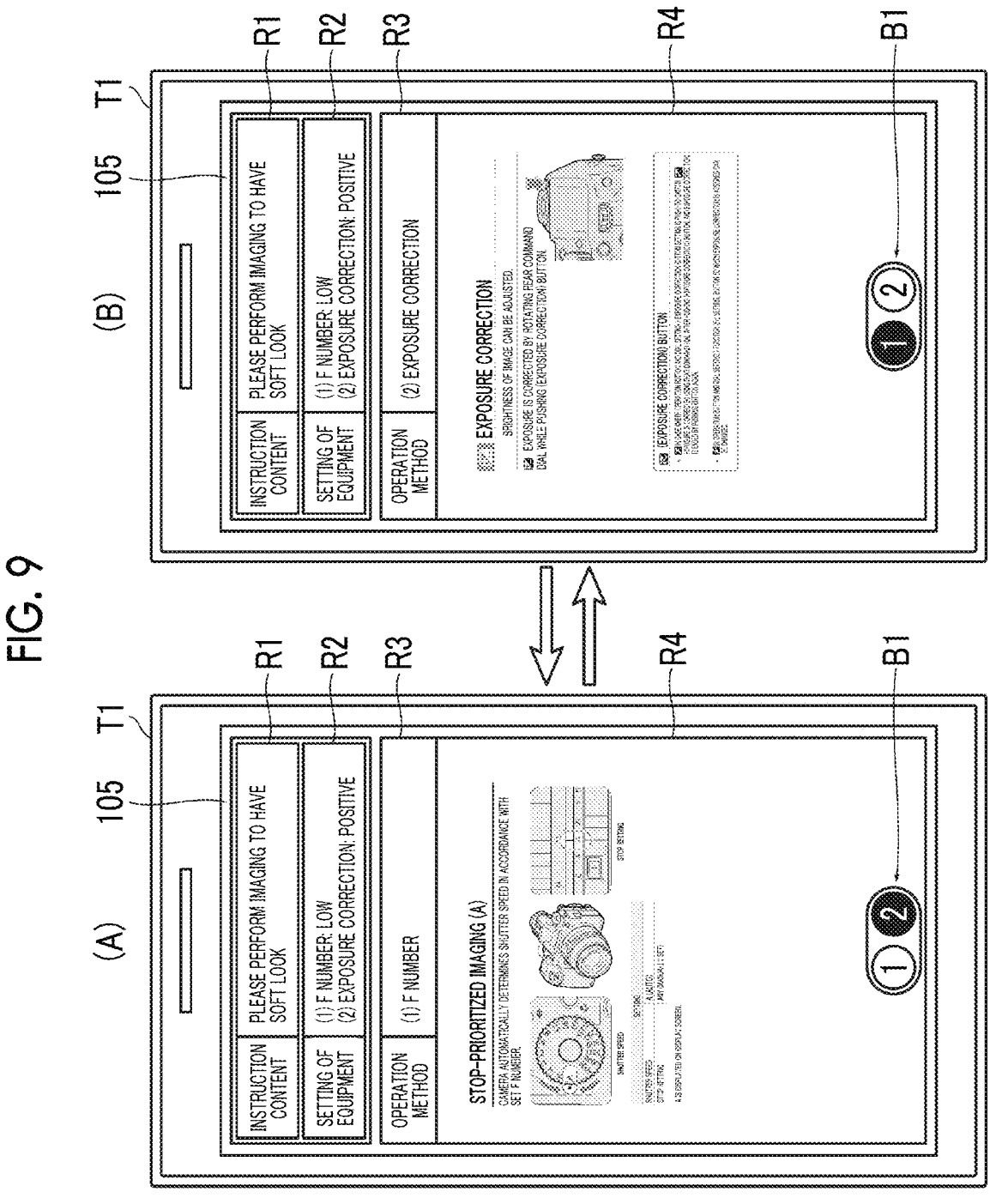
FIG. 9 is a diagram illustrating an example of display of operation information, instruction information, and setting information on a display.

FIG. 9 is a diagram illustrating an example of display of the operation information, the instruction information, and the setting information on the display. FIG. 9 illustrates an output example of the operation information with respect to the imaging instruction "please perform imaging to have a soft look".

As described above, the setting information "F number: low, exposure correction: positive" is derived from the imaging instruction "please perform imaging to have a soft look". The data of the page of the manual on which the operation method of the F number is described and the data of the page of the manual on which the operation method of the exposure correction is described are output from the setting information as the operation information. An example in which the data of the page of the manual on which the operation method of the F number is described is displayed as the operation information is illustrated in (A) of FIG. 9. An example in which the data of the page of the manual on which the operation method of the exposure correction is described is displayed as the operation information is illustrated in (B) of FIG. 9.

As illustrated in (A) and (B) of FIG. 9, a first region R1 to a fourth region R4 are set on the screen of the display 105 of the first terminal apparatus T1 as a display region of information. The first region R1 is a display region of information "instruction content" and displays the instruction information. The second region R2 is a display region of information "setting of equipment" and displays the setting information. In a case where a plurality of setting items are included in the setting information, each item is displayed with a number. The third region R3 is a display region of information "operation method" and displays information about an item to be operated. That is, information about a setting item to be operated is displayed. A display example in a case where the setting item to be operated is "F number" is illustrated in (A) of FIG. 9. An example in a case where the setting item to be operated is "exposure correction" is illustrated in (B) of FIG. 9. The fourth region R4 is a display region of the manual and displays the data of the page of the manual on which the operation method of the setting item to be operated is described. A display example of the data of the page of the manual on which the operation method of the F number is described is illustrated in (A) of FIG. 9. A display example of the data of the page of the manual on which the operation method of the exposure correction is described is illustrated in (B) of FIG. 9. For example, the data of the page displayed in the fourth region R4 is enlarged, reduced, and moved by operations such as pinching in, pinching out, and sliding on the screen. A switching button B1 is displayed in the fourth region R4. A setting item to be displayed is switched by touching the switching button B1.

The display form in FIG. 9 is merely an example, and the display of the operation information and the like can employ various forms.

Action of Information Processing System

Next, a flow of a series of processes (information processing method) performed by the information processing system 1 of the present embodiment will be described.

As described above, the information processing system 1 of the present embodiment is configured as a system that receives the instruction with respect to imaging from the requesting person P2, derives the operation method of the equipment C required for performing imaging complying with the instruction, and presents the operation method to the imaging person P1. Connection between the imaging person P1 and the requesting person P2 is made using a well-known matching service, a social networking service (SNS), or the like. As an example, matching is established such that the requesting person P2 posts content of a request (a target to be imaged, an imaging location, an imaging date and time, and the like) on an electronic bulletin board using a computer network, and a person who can contract for the request applies for the posting. In addition, for example, it is possible to employ a method of establishing matching by extracting and presenting a user who matches the content of the request of the requesting person P2 from users who have registered available conditions for imaging (the target to be imaged, the imaging location, and the imaging date and time).

Figure 10:
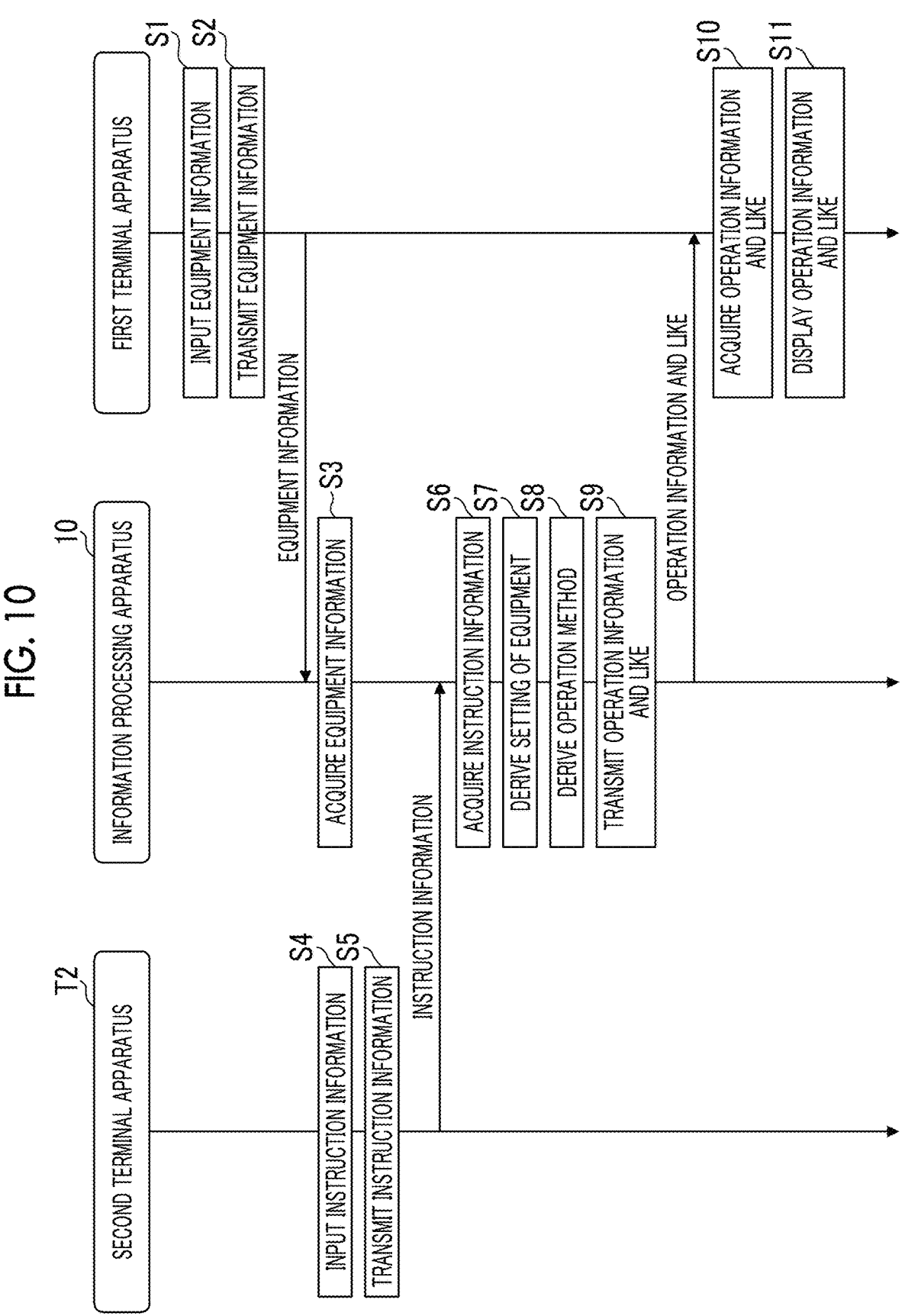
FIG. 10 is a sequence diagram of processing performed by the information processing system.

FIG. 10 is a sequence diagram of processing performed by the information processing system.

First, the imaging person P1 inputs the information about the equipment C (equipment information) used in imaging into the first terminal apparatus T1 (step S1). The manufacturer name and the apparatus type name are input as the equipment information. The input equipment information is transmitted to the information processing apparatus 10 (step S2). The information processing apparatus 10 receives the equipment information transmitted from the first terminal apparatus T1 and acquires the input of the equipment information (step S3).

Meanwhile, the requesting person P2 of imaging inputs the information about the content of the instruction with respect to imaging (instruction information) into the second terminal apparatus T2 (step S4). The instruction content is input as a sentence expressed in a natural language. The input instruction information is transmitted to the information processing apparatus 10 (step S5). The information processing apparatus 10 receives the instruction information transmitted from the second terminal apparatus T2 and acquires the input of the instruction information (step S6).

The information processing apparatus 10 analyzes the acquired instruction information and derives the setting of the equipment required for performing imaging complying with the instruction (step S7). In this case, first, the information processing apparatus 10 extracts the topic from the sentence indicating the content of the instruction. Next, the setting of the equipment corresponding to the topic is derived by referring to the equipment setting database 14A.

After the setting of the equipment is derived, the operation method of the equipment C required for performing the derived setting is derived (step S8).

In this case, the information processing apparatus 10 derives the operation method of the equipment C by referring to the manual database 14B. More specifically, the operation method is derived using the following procedure. First, the data of the manual of the equipment C used by the imaging person P1 is acquired from the manual database 14B based on the equipment information. Next, the page of the manual on which the target operation method is described is specified by referring to the index data included in the data of the manual. That is, the page on which the operation method for performing the derived setting is specified. The data of the specified page is extracted from the body data of the manual, and the operation information is derived.

The information processing apparatus 10 outputs (transmits) the derived operation information to the first terminal apparatus T1 of the imaging person P1 (step S9).

The first terminal apparatus T1 acquires (receives) the operation information output (transmitted) from the information processing apparatus 10 (step S10) and displays the operation information on the display 105 in a predetermined format (step S11). The imaging person P1 checks the display (refer to FIG. 9) of the display 105 of the first terminal apparatus T1 and performs imaging by operating the equipment C. For example, captured images are transmitted to the second terminal apparatus T2 from the first terminal apparatus T1 through the information processing apparatus 10.

As described so far, according to the information processing system 1 of the present embodiment, an imaging method for performing imaging complying with the instruction of the requesting person P2 is presented to the imaging person P1. Accordingly, even in a case where the imaging person P1 is not familiar with the imaging equipment, an appropriate imaging instruction can be provided. In addition, in a case of requesting another person to perform imaging using the matching service or the like, it is possible to perform imaging that reflects the intention of the requesting person P2.

Second Embodiment

Figure 11:
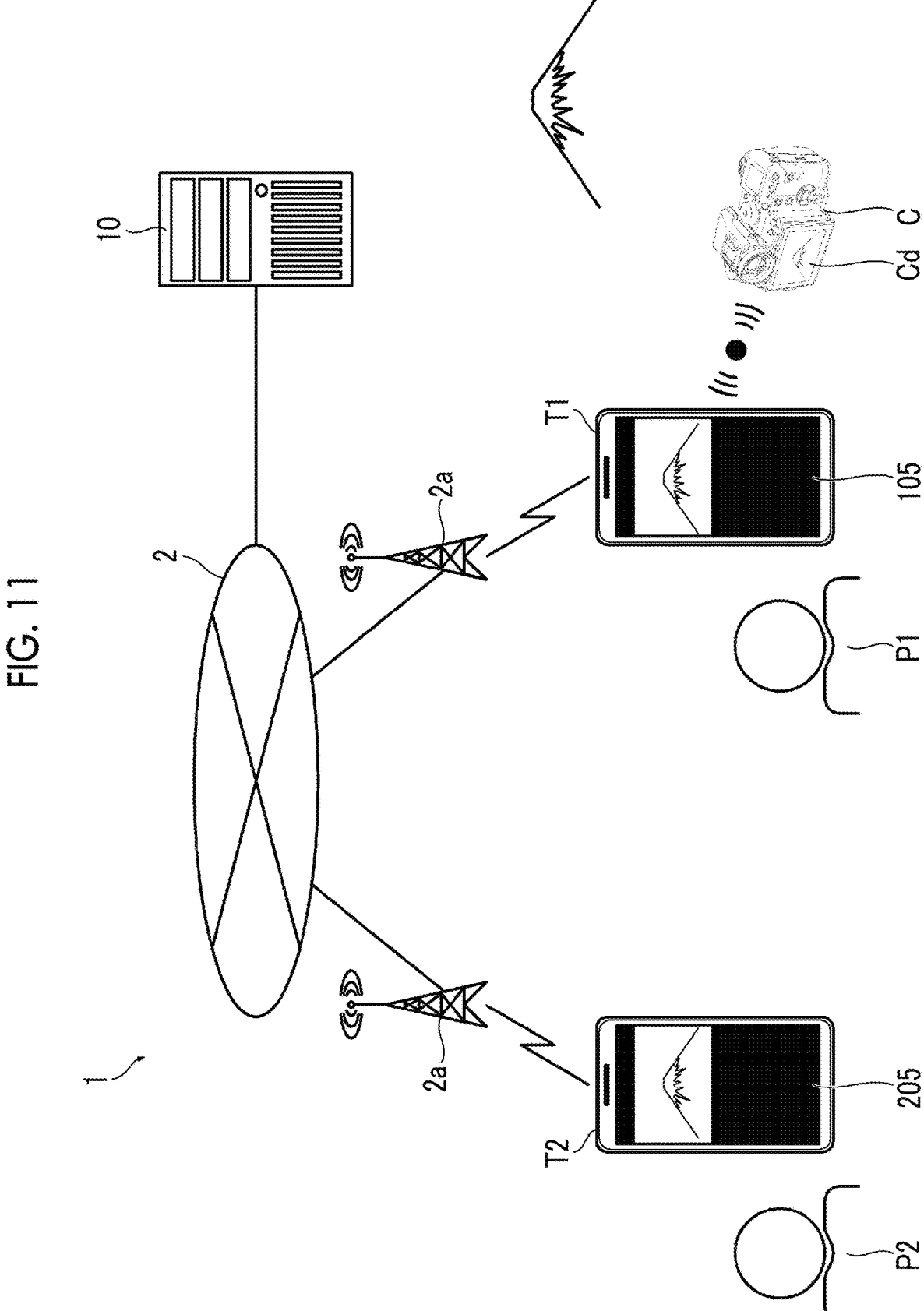
FIG. 11 is a diagram illustrating a second embodiment of the information processing system.

FIG. 11 is a diagram illustrating a second embodiment of the information processing system.

The information processing system 1 of the present embodiment is configured as a system that enables the requesting person P2 to check the images being captured by the imaging person P1 in real time. That is, a system that enables a video of a live view to be checked with the second terminal apparatus T2 on the requesting person P2 side is configured (a system that performs so-called live streaming is configured).

As illustrated in FIG. 11, the equipment (camera) C owned by the imaging person P1 and the first terminal apparatus T1 are communicably connected, and images displayed on a display Cd of the equipment C are transmitted to the first terminal apparatus T1. The images transmitted to the first terminal apparatus T1 are transmitted to the information processing apparatus 10 through the communication network 2. The images transmitted to the information processing apparatus 10 are further transmitted to the second terminal apparatus T2 of the requesting person P2 through the communication network 2 and are displayed on the display 205 of the second terminal apparatus T2.

Figure 12:
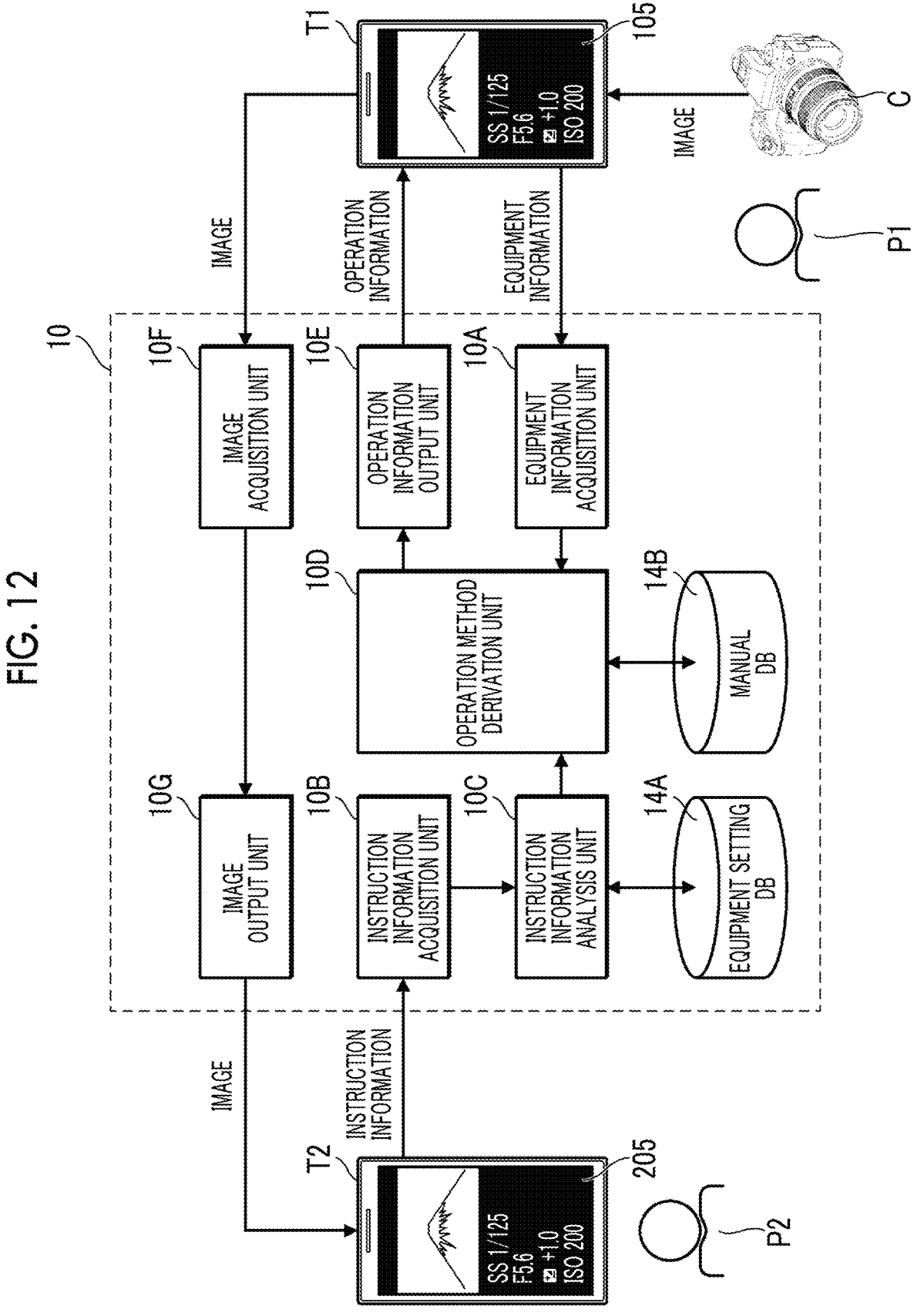
FIG. 12 is a block diagram of main functions provided by the information processing apparatus.

FIG. 12 is a block diagram of main functions provided by the information processing apparatus.

As illustrated in FIG. 12, the information processing apparatus 10 of the present embodiment further has functions of an image acquisition unit 10F and an image output unit Other functions are the same as those of the information processing apparatus 10 of the first embodiment. Accordingly, the functions of the image acquisition unit 10F and the image output unit 10G will be described here.

The image acquisition unit 10F acquires the images transmitted from the first terminal apparatus T1 of the imaging person P1. As described above, the images transmitted from the first terminal apparatus T1 are the images displayed on the display (including an electronic view finder) Cd comprised in the equipment C. In a case where a live view is displayed on the display Cd of the equipment C, images of the live view are transmitted. The images are sequentially transmitted. In the present embodiment, the images of the live view transmitted from the equipment C through the first terminal apparatus T1 are an example of images captured by the equipment C in time series.

A method of communication between the first terminal apparatus T1 and the equipment C is not particularly limited. As an example, the images are transmitted to the first terminal apparatus T1 from the equipment C using short range wireless communication such as Bluetooth (registered trademark) or a wireless local area network (LAN). These kinds of technology are well-known and thus, will not be described in detail.

The image output unit 10G sequentially outputs (transmits) the images acquired by the image acquisition unit 10F to the second terminal apparatus T2 of the requesting person P2. The second terminal apparatus T2 of the requesting person P2 sequentially receives the images output from the information processing apparatus 10 and displays the images on the display 205.

Figure 13:
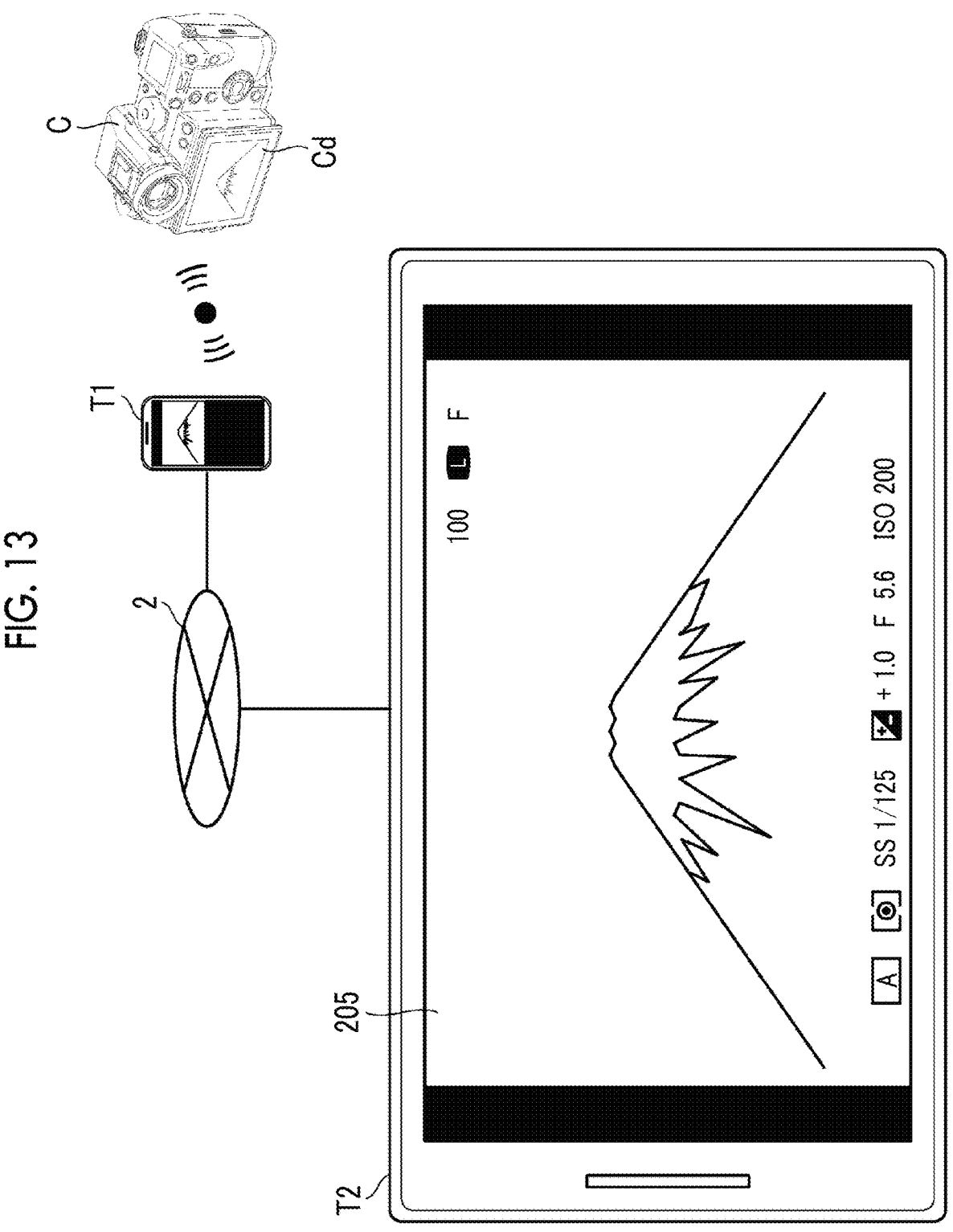
FIG. 13 is a diagram illustrating an example of display on a display of the second terminal apparatus.

FIG. 13 is a diagram illustrating an example of display on the display of the second terminal apparatus. FIG. 13 illustrates an example of a case where the live view is displayed on the display Cd in the equipment C of the imaging person.

As illustrated in FIG. 13, the images displayed on the display Cd of the equipment C of the imaging person are also displayed on the display 205 of the second terminal apparatus T2 of the requesting person. In a case where the live view is displayed on the display Cd of the equipment C of the imaging person, the images of the live view are also displayed on the display 205 of the second terminal apparatus T2 of the requesting person. In a case where setting information (the shutter speed, the F number, the exposure correction amount, the ISO sensitivity, and the like) and the like of the equipment are displayed in a superimposed manner on the images of the live view in the equipment C of the imaging person, the information is also displayed. By displaying these information together, the requesting person can check with which setting the imaging person is performing imaging.

According to the information processing system 1 of the present embodiment, the requesting person P2 can check the images being captured by the imaging person P1 in real time. Accordingly, the requesting person P2 can provide a more detailed imaging instruction. Accordingly, it is possible to perform imaging that more reflects the intention of the requesting person P2.

While it is configured to transmit information about the screen of the equipment C of the imaging person P1 in the present embodiment, it can also be configured to transmit only the captured images. In addition, in transmission, sizes of the images may be changed. For example, the images may be reduced from the sizes of the images displayed on the display Cd of the equipment C and transmitted. Furthermore, the images may be changed in frame rate and transmitted.

Third Embodiment

In the information processing system 1 of the present embodiment, the images captured by the imaging person P1 are transmitted to the second terminal apparatus T2 of the requesting person P2. In addition, information related to the setting of the equipment C in capturing the images is transmitted to the information processing apparatus 10. Based on the acquired information, the information processing apparatus 10 derives the setting of the equipment required for performing imaging complying with the instruction from the requesting person P2.

Figure 14:
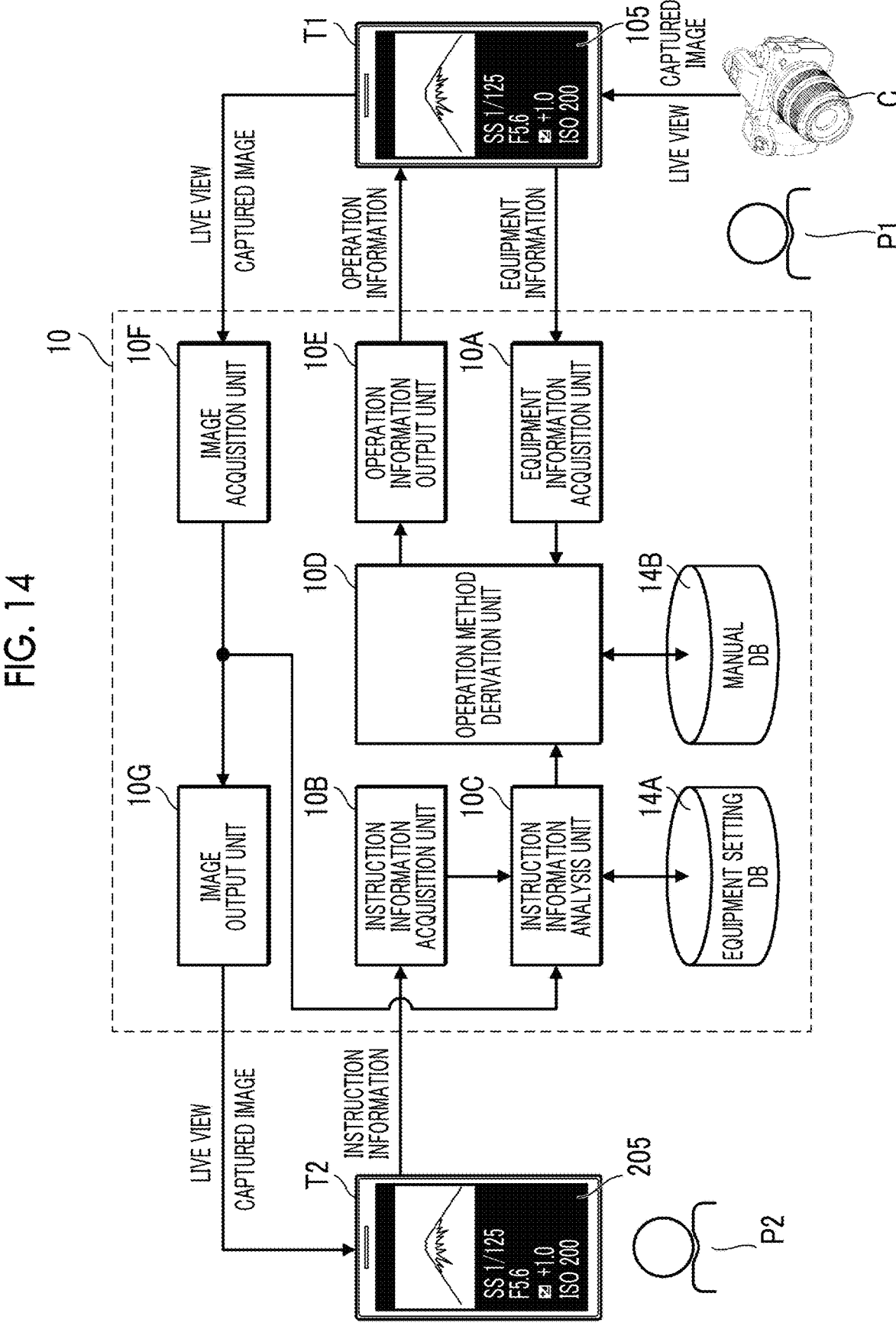
FIG. 14 is a block diagram of main functions provided by the information processing apparatus.

FIG. 14 is a block diagram of main functions provided by the information processing apparatus.

In the same manner as the information processing apparatus 10 of the second embodiment, the information processing apparatus 10 of the present embodiment has the functions of the image acquisition unit 10F and the image output unit 10G.

The image acquisition unit 10F acquires the images transmitted from the first terminal apparatus T1 of the imaging person P1. The images transmitted from the first terminal apparatus T1 include an actually captured image in addition to the images of the live view. That is, an image captured by a release operation (captured image) is included. Information (so-called metadata) related to the setting in capturing the image is added to the captured image. As an example, exchangeable image file format (Exif) data is added to the image. Thus, the information related to the setting in capturing the image can be acquired by referring to the information (metadata) added to the image. The Exif data includes information about a resolution of the entire image, a resolution per unit in horizontal and vertical directions, the shutter speed, a speed, the F number, the ISO sensitivity, a photometry mode, whether or not a flash is used, a step value of the exposure correction, a focal length, and a color space, and the like.

The image output unit 10G outputs (transmits) the images acquired by the image acquisition unit 10F to the second terminal apparatus T2 of the requesting person P2. Accordingly, the captured image is output to the second terminal apparatus T2 of the requesting person P2 in addition to the images of the live view. The second terminal apparatus T2 of the requesting person P2 receives the images output from the information processing apparatus 10 and displays the images on the display 205. Accordingly, the actually captured image (captured image) is displayed on the display 205 in addition to the images of the live view. The requesting person P2 checks the actually captured image (captured image) and provides the imaging instruction.

The captured image acquired by the image acquisition unit 10F is further provided to the instruction information analysis unit 10C. The instruction information analysis unit 10C derives the setting of the equipment required for performing imaging complying with the instruction based on the instruction information and on the metadata of the captured image.

Figure 15:
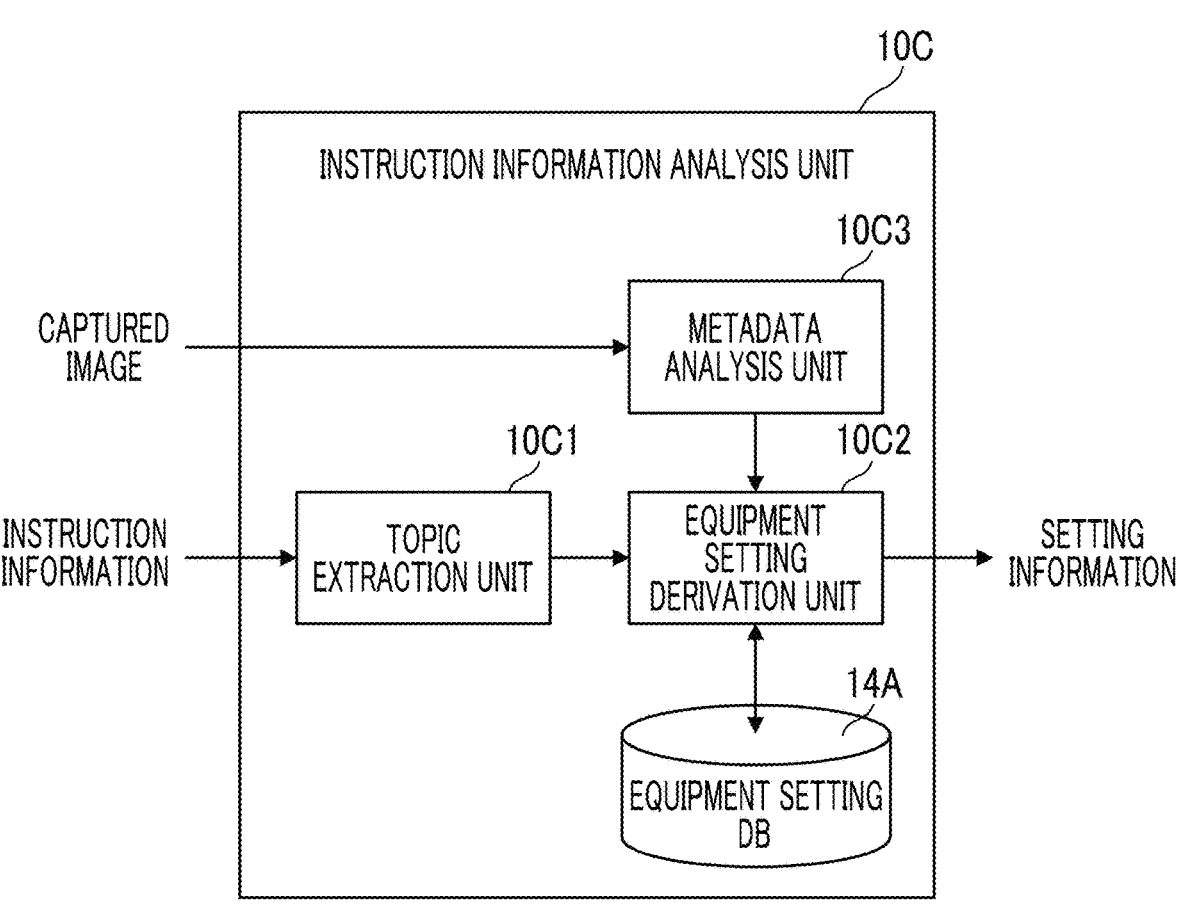
FIG. 15 is a main block diagram of functions of the instruction information analysis unit.

FIG. 15 is a main block diagram of functions of the instruction information analysis unit.

As illustrated in FIG. 15, the instruction information analysis unit 10C of the present embodiment further includes a metadata analysis unit 10C3.

The metadata analysis unit 10C3 analyzes the metadata of the captured image and acquires the information related to the setting in capturing the captured image. The acquired information is provided to the equipment setting derivation unit 10C2.

The equipment setting derivation unit 10C2 derives the setting of the equipment corresponding to the topic extracted by the topic extraction unit 10C1. In this case, the equipment setting derivation unit 10C2 derives the setting of the equipment corresponding to the topic by referring to the information acquired by the metadata analysis unit 10C3 (the information related to the setting in capturing the captured image). As in the first embodiment, the equipment setting derivation unit 10C2 derives the setting of the equipment corresponding to the topic by referring to the equipment setting database 14A. In the equipment setting database 14A, a plurality of terms related to imaging are recorded, and the setting information of the equipment is recorded in association with each recorded term. In addition, information about a preferable setting range is included in the setting information of the equipment. For example, information "F number: low (F8 to F11), exposure correction: positive (+1.0 to +1.5)" is recorded as the setting information of the equipment with respect to the term "to have a soft look".

The equipment setting derivation unit 10C2 acquires the setting information of the equipment corresponding to the topic by referring to the equipment setting database 14A with respect to the topic extracted by the topic extraction unit 10C1. The setting of the equipment corresponding to the topic is derived by referring to the information acquired by the metadata analysis unit 10C3 (the information related to the setting in capturing the captured image). For example, in a case where the setting of the F number is F5.6 and the exposure correction is not performed in capturing the captured image with respect to the term "to have a soft look", setting information "F number: low, exposure correction: positive" is derived. Meanwhile, in a case where the setting of the F number is F8 and the exposure correction is not performed in capturing the captured image, setting information "exposure correction: positive" is derived.

The operation method derivation unit 10D derives the operation method of the equipment C based on the setting information derived by the instruction information analysis unit 10C.

According to the information processing system of the present embodiment, it is possible to provide the imaging instruction based on the image captured by the imaging person P1. In addition, the setting of the equipment can be derived based on a result of previously performed imaging (the setting of the equipment). Accordingly, it is possible to capture an image that reflects the intention of the requesting person.

As in the information processing system of the present embodiment, in a case of deriving the setting of the equipment based on the result of previously performed imaging, a situation in which a preferable setting cannot be derived may occur. For example, in a case where previously performed imaging is performed with a preferable setting range, the setting cannot be further suggested. In this case, it may be configured to transmit a message prompting the requesting person P2 to change the instruction content or a message indicating that the setting cannot be performed.

MODIFICATION EXAMPLE

While it is configured to derive the setting for performing imaging complying with the instruction based on the information related to the setting of the equipment in capturing the captured image in the above embodiment, it may be configured to derive the setting for performing imaging complying with the instruction further based on the captured image or based on only the captured image. Specifically, the setting for performing imaging complying with the instruction is derived by analyzing the captured image. For example, the setting for performing imaging complying with the instruction is derived by analyzing the captured image to obtain brightness, sharpness, and the like of the image.

Other Embodiments and Modification Examples

System Configuration

While an example in which the first terminal apparatus T1 is configured as a computer such as a smartphone having a communication function has been described in the embodiments, an apparatus constituting the first terminal apparatus T1 is not limited thereto. For example, in a case where the equipment (imaging equipment) used by the imaging person P1 for imaging has a communication function and a function as a computer (a processor, a memory, and the like), the imaging equipment can be used as the first terminal apparatus T1. In this case, direct communication is performed between the information processing apparatus and the equipment C such as a camera. In addition, the equipment information is directly transmitted to the information processing apparatus 10 from the equipment C such as a camera, and the operation information and the like are directly transmitted to the equipment C such as a camera from the information processing apparatus 10. In addition, the transmitted operation information and the like are directly displayed on the display comprised in the equipment C such as a camera.

In addition, the second terminal apparatus T2 can also be configured as a personal computer or the like in addition to a mobile computer such as a smartphone.

In addition, while it is configured to provide the information processing apparatus 10 separately from the first terminal apparatus T1 and from the second terminal apparatus T2 in the embodiments, the first terminal apparatus T1 or the second terminal apparatus T2 may have the functions of the information processing apparatus 10. That is, the first terminal apparatus T1 or the second terminal apparatus T2 may be configured to perform various types of processing performed by the information processing apparatus 10.

Data Related to Manual

While it is configured to record data related to the manual in the manual database 14B in advance in the embodiments, a method of acquiring the data related to the manual is not limited thereto. For example, it may be configured to cause the imaging person P1 to transmit the data related to the manual to the information processing apparatus 10 through the first terminal apparatus T1. In this case, it may be configured to record the data related to the manual transmitted from the imaging person P1 in the manual database 14B. Accordingly, data related to manuals of a plurality of pieces of equipment can be collected. In addition, it may be configured to request the imaging person P1 to provide the data related to the manual only in a case where the data related to the manual of the equipment used by the imaging person P1 is not recorded in the manual database 14B.

Derivation of Operation Method

While the operation method of the equipment is derived by extracting the data of the corresponding page of the manual data in the embodiments, a method of deriving the operation method of the equipment is not limited thereto. For example, it may be configured to derive the operation method by extracting only a region in which the operation method is described on the corresponding page instead of the data of the entire page.

In addition, for example, it may be configured to search for a web page on which the target operation method is posted on the internet and to output the corresponding web page as the operation information. For example, the web page on which the target operation method is posted is searched by targeting a website of the manufacturer of the equipment used by the imaging person P1, and the corresponding web page is output as the operation information. In this case, for example, the web page on which the target operation method is posted may be searched using a well-known search engine.

In addition, while it is configured to search for the corresponding page using the index data in the embodiments, it may be configured to search for the corresponding page by analyzing the body data.

In addition, the data related to the manual can also be configured as video data. That is, the operation method corresponding to each term is recorded as a video.

Output of Operation Information and Like

While it is configured to output the instruction information and the setting information to the first terminal apparatus T1 of the imaging person P1 together with the operation information in the embodiments, the operation information may be the only information output to the first terminal apparatus T1 of the imaging person P1. That is, it may be configured to notify the imaging person P1 of the instruction information and of the setting information by other means (for example, a telephone or an electronic mail). In addition, for example, it may be configured to provide a so-called chat function in the information processing apparatus 10 so that messages can be transmitted and received between the requesting person P2 and the imaging person P1.

Derivation of Setting Information

For example, it may be configured to directly derive the setting of the equipment (setting information) required for performing imaging complying with the instruction from the instruction information using a trained model or the like.

In addition, in a case of setting a plurality of items, an order of the plurality of items, that is, an order of setting, can also be defined. In this case, operation methods are set to be displayed in the defined order.

Equipment Used for Imaging

As described above, the equipment used for imaging includes an apparatus having a camera function such as a smartphone with a camera in addition to a so-called camera. In addition, the camera is not limited to a digital camera, and a video camera, a television camera, a movie camera, and the like are also included. In addition, a so-called film camera is also included.

In addition, the imaging instruction is not limited to an imaging instruction for a still image, and an imaging instruction for a video is also included.

Requesting Person and Imaging Person

The requesting person and the imaging person may be identical. In this case, a specific operation method in a case of performing specific imaging can be known for the used equipment.

Hardware Configuration of Information Processing Apparatus

Each function of the information processing apparatus can be configured using various processors. The various processors include a central processing unit (CPU) that is a general-purpose processor functioning as various processing units by executing a program, a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like. One processing unit constituting the information processing apparatus may be composed of one of the various processors or of two or more processors of the same type or different types. For example, one processing unit may be composed of a plurality of FPGAs or of a combination of a CPU and an FPGA. In addition, a plurality of processing units may be composed of one processor. A first example of a plurality of processing units composed of one processor is, as represented by computers such as a client and a server, a form of one processor composed of a combination of one or more CPUs and software, in which the processor functions as a plurality of processing units. A second example is, as represented by a system on chip (SoC) and the like, a form of using a processor that implements functions of the entire system including a plurality of processing units in one integrated circuit (IC) chip. Various processing units are configured using one or more of the various processors as a hardware structure. Furthermore, the hardware structure of those various processors is more specifically an electric circuit (circuitry) in which circuit elements such as semiconductor elements are combined.

EXPLANATION OF REFERENCES

1: Information processing system
2: communication network

2a: base station
10: information processing apparatus
10A: equipment information acquisition unit
10B: instruction information acquisition unit
10C: instruction information analysis unit
10C1: topic extraction unit
10C2: equipment setting derivation unit
10C3: metadata analysis unit
10D: operation method derivation unit
10E: operation information output unit
10F: image acquisition unit
10G: image output unit
11: CPU
12: ROM
13: RAM
14: auxiliary storage device
14A: equipment setting database
14B: manual database
15: display
16: network OF
17: keyboard
18: mouse
19: optical drive
101: CPU
102: ROM
103: RAM
104: flash memory
105: display
106: touch panel
107: GPS reception unit
108: camera unit
109: microphone unit
110: speaker unit
111: communication unit
111A: antenna
112: short range wireless communication unit
112A: antenna
113: sensor unit
114: media drive
115: memory card
201: CPU
202: ROM
203: RAM
204: flash memory
205: display
206: touch panel
207: GPS reception unit
208: camera unit
209: microphone unit
210: speaker unit
211: communication unit
211A: antenna
212: short range wireless communication unit
212A: antenna
213: sensor unit
214: media drive
215: memory card
B1: switching button
C: equipment
Cd: display of equipment
P1: imaging person
P2: requesting person
R1: first region on display screen of first terminal apparatus
R2: second region on display screen of first terminal apparatus R3: third region on display screen of first terminal apparatus R4: fourth region on display screen of first terminal apparatus T1: first terminal apparatus T2: second terminal apparatus S1 to S11: procedure of processing performed by information processing system

What is claimed is:

1. An information processing apparatus comprising:
a processor,
wherein the processor is configured to:
acquire, from a first terminal configured to receive user input, input of first information related to information about equipment used for imaging performed by a first user;
acquire, from a second terminal configured to receive user input, input of second information related to information about content of an instruction with respect to imaging requested by a second user different from the first user;
derive, according to the first information and the second information, a setting of the equipment required for performing the requested imaging complying with the instruction, and a method of operation to be performed by the first user on the equipment required for the derived setting; and
output, to the first terminal, third information related to information about the operation derived method of operation.

2. The information processing apparatus according to claim 1,
wherein the processor is further configured to output the second information to the first terminal.

3. The information processing apparatus according to claim 1,
wherein the second information is composed of text information, and
the processor is configured to:
extract a topic related to the requested imaging from the text information; and
derive the setting corresponding to the extracted topic.

4. The information processing apparatus according to claim 3,
wherein the processor is configured to derive the setting corresponding to the extracted topic by referring to a first database in which information related to the setting is recorded.

5. The information processing apparatus according to claim 4,
wherein the processor is configured to derive the setting corresponding to the extracted topic by referring to the first database in which the topic and the information related to the setting are recorded in association with each other.

6. The information processing apparatus according to claim 1,
wherein the processor is configured to:
acquire information related to a manual corresponding to the equipment from a second database in which information related to a manual of the equipment is recorded; and
derive the method of operation based on the information related to the manual.

7. The information processing apparatus according to claim 6, wherein the first information includes the information related to the manual of the equipment, and
the processor is configured to acquire the input of the first information and record the information related to the manual of the equipment included in the first information in the second database.

8. The information processing apparatus according to claim 6,
wherein the processor is configured to extract, from the manual of the equipment, a location in which the method of operation of the equipment required for the derived setting is described.

9. The information processing apparatus according to claim 1,
wherein the processor is configured to receive images captured by the equipment in time series and transmit the images to the second terminal.

10. The information processing apparatus according to claim 1,
wherein the processor is configured to:
receive information related to a setting of the equipment in capturing an image; and
derive the setting of the equipment required for performing the requested imaging complying with the instruction and the method of operation to be performed by the first user on the equipment required for the derived setting based on the first information, the second information, and the information related to the setting of the equipment in capturing the image.

11. An information processing system comprising:
the information processing apparatus according to claim 1;
the first terminal owned by the first user; and
the second terminal owned by the second user.

12. An information processing method comprising:
acquiring, from a first terminal configured to receive user input, input of first information related to information about equipment used for imaging performed by a first user;
acquiring, from a second terminal configured to receive user input, input of second information related to information about content of an instruction with respect to imaging requested by a second user different from the first user;
deriving, according to the first information and the second information, a setting of the equipment required for performing the requested imaging complying with the instruction, and a method of operation to be performed by the first user on the equipment required for the derived setting; and
outputting, to the first terminal, third information related to information about the operation derived method of operation.

13. A non-transitory, computer readable tangible recording medium which records thereon a program for causing, when read by a computer, the computer to implement:
a function of acquiring, from a first terminal configured to receive user input, input of first information related to information about equipment used for imaging performed by a first user;
a function of acquiring, from a second terminal configured to receive user input, input of second information related to information about content of an instruction with respect to imaging requested by a second user different from the first user;

a function of deriving, according to the first information and the second information, a setting of the equipment required for performing the requested imaging complying with the instruction, and a method of operation to be performed by the first user on the equipment required for the derived setting; and a function of outputting, to the first terminal, third information related to information about the derived method of operation.

* * * * *